united States Patent Office 3,410,058
Patented Nov. 12, 1968

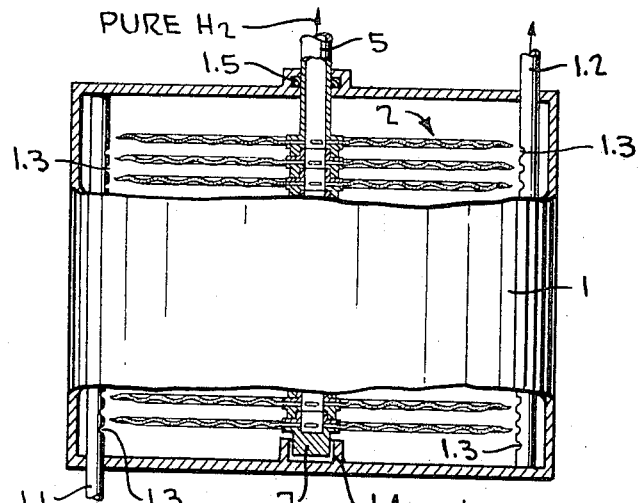
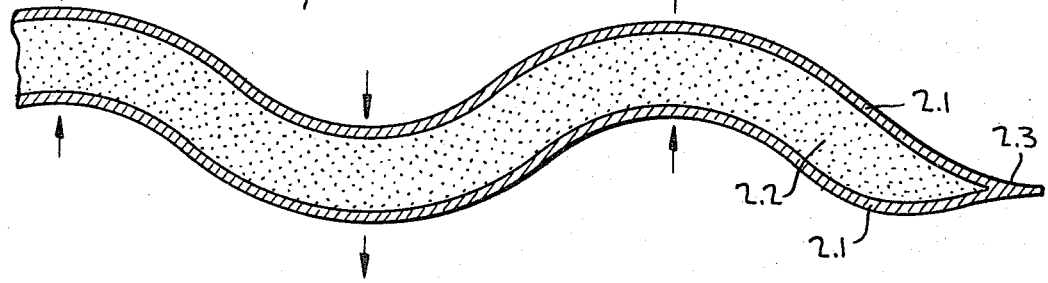
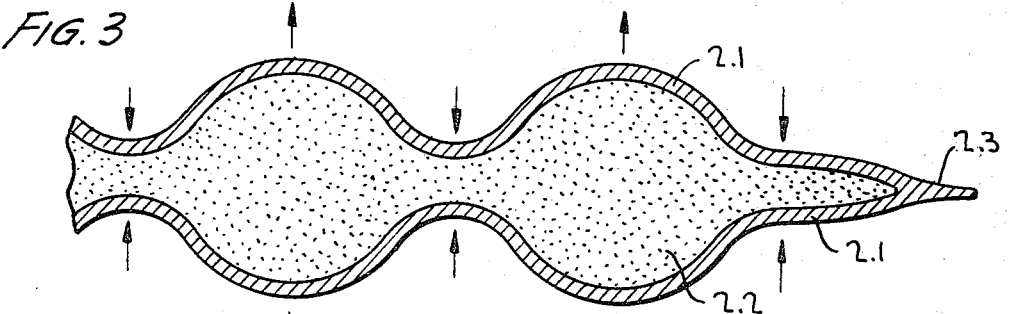
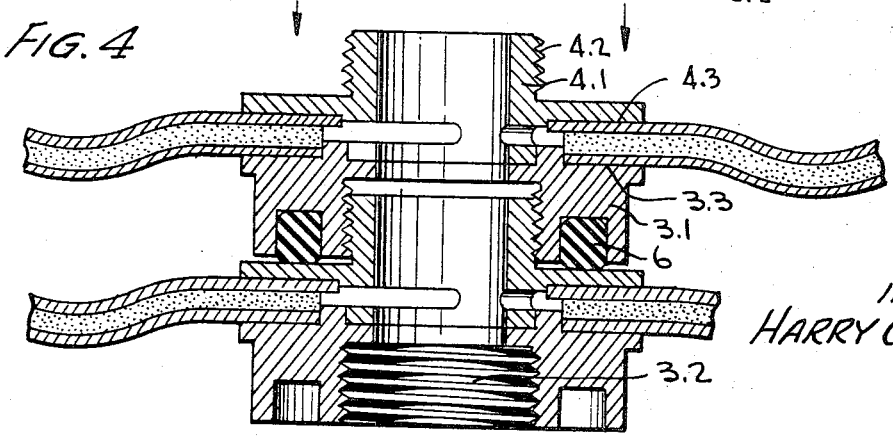

3,410,058
HYDROGEN DIFFUSER-PURIFIER
Harry G. Oswin, Chauncey, N.Y., assignor to Leesona Corporation, Warwick, R.I., a corporation of Massachusetts
Filed Sept. 8, 1966, Ser. No. 577,906
8 Claims. (Cl. 55—158)

ABSTRACT OF THE DISCLOSURE

An improved device for the separation of hydrogen from gaseous mixtures containing hydrogen is described. The apparatus comprises one or more elements made up of two circular nonporous hydrogen permeable membranes having a plurality of indentations extending from their center to their peripheries. The membranes are sealed together at their peripheries. The indentations are matched to be in phase or out of phase prior to sealing. The device provides a large surface area for the absorption of hydrogen gas and, moreover, accommodates the stress of the membranes caused by expansion due to absorption of the hydrogen gas. Extremely thin membranes are utilizable in the device.

This invention relates to an improved apparatus for purification of hydrogen. More particularly, the invention comprises an improved apparatus for separating hydrogen in highly purified form from gaseous impurities produced as by-products along with the formation of hydrogen in most common processes.

Essentially, the apparatus comprises one or a plurality of elements made up from two circular nonporous hydrogen permeable membranes which are sealed together at their peripheries. The membranes are stamped, or indented, to form matched surfaces with a hole at the center of at least one of the membranes. The membranes are sealed with the indentation in phase or out of phase. In operation of the apparatus, impure hydrogen is brought in contact with the sealed membranes. Pure hydrogen diffuses through the membranes into the area between the sealed membranes and is removed through the hole at the center.

In the prior art, hydrogen has been purified by flowing an impure stream of hydrogen against a nonporous membrane composed of palladium as described in U.S. Patent No. 1,174,631 to Walter O. Snelling. According to the Snelling teaching, it may be desirable to have a porous earthenware or alundum support to hold the membranes in place. As an improvement over the Snelling method, William J. Hale in U.S. Patent No. 2,206,773 described the superiority of palladium/silver alloy membranes for the separation of hydrogen from vaporous or gaseous mixtures.

Although it is recognized that the most compact and reliable hydrogen purifiers available today employ nonporous hydrogen diffusion membranes, such as membranes of palladium or palladium/silver alloys, the presently available diffuser-purifiers are both costly and unreliable. The cost of the unit is primarily determined by the flux of hydrogen which can be obtained per unit of membrane metal. Since palladium/silver alloys containing approximately 25 atomic percent weight of silver cost in the neighborhood of $26 per troy ounce, it is obvious that the quantity of metal used per standard cubic foot per hour of pure hydrogen capacity should be minimized. However, as a result of problems encountered in the fabrication of the membranes, it has been impossible to reduce the amount of metal below certain limits.

More specifically, a particular problem in the design of nonporous membranes for use in hydrogen diffusers is the tendency of such membranes to expand when contacted with hydrogen. This expansion is dependent upon both temperature and the partial pressure of hydrogen in the system. The lattice expansion is greatest at lower temperatures and higher pressures. Referring specifically to an alloy of 75 percent palladium and 25 percent silver, it has been found that at room temperature and one atmosphere hydrogen partial pressure, an expansion of 2.4 percent occurs. Therefore, a major mechanical problem in the manufacture of diffuser-purifiers is to accommodate for the hydrogen expansion and retain unit stability. Obviously, on large dimensions, the linear expansion can cause wrinkling or cracking of the membrane material if it is excessively restrained. If the material is completely unrestrained, it is likely to separate from any dissimilar metal to which it is joined.

Presently available diffusers, therefore, are preferably based on the use of tubular diffusion membranes in that small outer diameter tubes can withstand large differential pressures when given reasonable internal support and the length of the join to a dissimilar metal is minimized. According to the existing art, tubes are used in bundles contained in a pressure container into which the high pressure impure hydrogen is introduced. Pure hydrogen diffuses through the tube and exits through an opening in the tube into a common manifold. Tubes of ⅛ inch and 1/16 inch outer diameter having walls of as low as 0.003 inch have been used in lengths up to four feet. These tubes are sealed at the end by swaging and the open end is brazed into a common header-manifold.

The aforesaid design, and modifications thereto, has inherent weaknesses, however, in that the tubes tend to twist and distort with use due to the inhomogeneity of the nonporous material and inadequate thickness control. The joining of the open tube ends into the common manifold presents severe manufacturing difficulties whether brazing or welding techniques are employed. Leaks in the manifold are relatively difficult to detect, isolate and repair. Thus, there are significant limitations to diffusers using nonporous tubular elements.

To circumvent the difficulties in using tubular diffuser-purifiers, an effort has been made in the art to use flat, nonporous membrane sheets. A problem is encountered, however, in that if the membranes are adequately supported, the available surface area of the membrane for diffusing hydrogen is decreased. On the other hand, if the membranes are unsupported, the expansion of the membrane as a result of the hydrogen adsorption causes sufficient movement of the membrane to break the welds at the point where the membranes are joined to a second material, such as the diffuser housing. Moreover, it is difficult to obtain a pin-hole free weld, particularly with thin membranes. In order to be assured that a completely pin-hole free membrane is obtained, the thickness of the membrane has to exceed at least about 0.003 inch. Therefore, the volume of hydrogen which can be obtained per unit of membrane foil is relatively low.

Accordingly, it is an object of the present invention to provide an improved hydrogen diffuser for separating hydrogen from gaseous mixtures.

It is another object of this invention to provide a hydrogen diffuser for purifying hydrogen from gaseous mixtures employing nonporous hydrogen diffusion membranes which have a thickness of no more than about 1.5 mils.

It is still another object of this invention to provide a hydrogen diffuser for separating and purifying hydrogen from gaseous mixtures comprising one or a plurality of elements composed of nonporous hydrogen diffusion membranes which provide a maximum area for contact with impure hydrogen gas permitting the purification of a large volume of hydrogen per unit of nonporous membrane.

These and other objects of the invention will become more fully apparent from the following detailed description, with particular emphasis being placed upon the illustrative examples.

According to the present invention, hydrogen diffuser-purifiers are fabricated from at least one element comprising two circular nonporous membranes which are stamped or indented to provide matched surfaces. In the event a plurality of elements are employed, a hole is cut in the center of both elements whereas, if a single element is employed in the purifier, a hole is cut at the center of only one element. In the preferred embodiment, a porous element, such as porous nickel or the like, is molded to conform to the configuration of the membranes. The aforesaid porous element is placed between the membranes and the membranes sealed at their periphery with the indentation either in phase or out of phase, retaining the porous element therebetween. Again, in the event a plurality of elements are employed, suitable male and female fittings are attached to each of the aforesaid center holes. In the event only one element is employed in the purifier, a suitable fitting is attached to the single hole. If a plurality of elements are employed, the elements are attached in operable association by means of the fittings and positioned in a housing which preferably has substantially the same shape and dimensions as the element or plurality of elements. The housing comprises inlet means for the introduction of an impure hydrogen stream and outlet means for the removal of impurities. In operation, an impure hydrogen stream is passed into the aforesaid housing at a suitable temperature and pressure. Ultra-pure hydrogen diffuses through the membranes of the element or plurality of elements and is removed through the center hole. Contaminants are vented through the outlet.

The unit is compact and highly reliable, with the components being easy to manufacture and assemble. The matched surfaces of the membrane, as will be more fully apparent hereinafter, permit the expansion of the elements due to the adsorption of hydrogen but, as a result of the control or balancing of stresses in the membranes caused by the expansion, prevent detrimental effects to the welds or seals of the unit. Moreover, inasmuch as the primary seal in the apparatus is at the periphery of the matched membranes and consists of a joining of like metal to like metal, little or no problem with leakage at the seal occurs. Since the exit hole is at the center of the circular membranes, the stresses due to the expansion of the membranes—as a result of the adsorption of hydrogen—is less noticeable. Thus, no break of the seal at the coupling points occurs. As is apparent, the individual elements of the hydrogen diffuser-purifier can be constructed as separate components with each element being tested for leakage prior to assembly. The couples having threaded or snap fittings permit convenient construction. As a result of the control or balancing of the stresses in the membranes, the membrane thicknesses can be greatly reduced providing an increased flux of hydrogen per unit of nonporous membrane.

In order to more particularly describe the invention, a preferred embodiment will be set forth with particular reference being made to the illustrative drawing which forms a material part of the present specification, and wherein like numerals are utilized to designate like parts throughout.

In the drawing:

FIGURE 1 is an elevational view partly in section of a diffuser-purifier comprising a plurality of elements;

FIGURE 2 is an enlarged sectional view of one end of matched nonporous membranes which are in phase separated by a porous body;

FIGURE 3 is an enlarged sectional view of one end of matched nonporous membranes which are out of phase separated by a porous body; and FIGURE 4 is an enlarged view in section showing the coupling of two elements together.

More specifically, referring to the various figures of the drawing, there is shown a diffuser-purifier comprising a housing 1 having an inlet means 1.1 and outlet means 1.2. Both the inlet and outlet means are of substantially the same length as the height of the housing and have a plurality of openings 1.3 uniformly spaced therein. A plurality of circular elements 2 comprising nonporous membranes 2.1 separated by porous body 2.2 are positioned within the housing. In the preferred embodiment as shown in FIGURES 1 and 2, the nonporous membranes and the porous body are stamped to have a matched configuration and assembled in phase. According to this embodiment, a particularly compact unit can be constructed since the membranes and the porous body are closed spaces throughout. Moreover, the porous body employed is more readily manufactured. The membranes are welded or brazed to form a gas-tight seal at their periphery 2.3. The circular membranes have an opening directly in their center and are provided with matched fittings 3.1 and 4.1. Fitting 3.1 is joined to one membrane 2.1 and fitting 4.1 is joined to the second membrane 2.1 to provide a gas-tight seal. In the embodiment shown in the drawing, the fittings are provided with screw threads 3.2 and 4.2 for connecting the elements to each other and to hydrogen removal conduit 5. Alternatively, the fittings can be of the snap-on type or of other suitable design. O-ring 6 provides a gas-tight seal between the fittings of the plurality of elements.

By employing circular nonporous membranes stamped to a matching congfiuration and employed in phase as shown in FIGURE 2 or out of phase as shown in FIGURE 3, the stresses which are placed on the membranes as a result of expansion due to hydrogen adsorption are largely controlled or balanced eliminating the problems encountered in prior art diffuser-purifiers. Thus, referring to FIGURES 2 and 3, the stresses are balanced in either direction as seen from the arrows illustrating the direction of the stresses.

In construction of the apparatus, circular nonporous membranes 2.1 are stamped to have matched configurations. Porous body 2.2 is molded to have an identical configuration to that of the membranes when sealed together, either in phase or out of phase. The porous body is inserted between the nonporous membranes as a support and to space the membranes from each other. The membranes are welded or brazed to provide a gas-tight seal at their periphery 2.3. Fittings 4.1 and 3.1 are then fitted to the respective membranes of the element and the membranes attached to the fittings with a gas-tight join at 3.3 and 4.3. At this stage of the construction, the individual elements are tested to determine if the membranes are free of pin-holes, i.e., are permeable only to hydrogen gas, and the seals at the peripheries and center fitting are gas-tight. Thereafter, a plurality of elements are connected together in operable association inserting O-ring 6 between the respective elements. Hydrogen removal tube 5 is attached to the uppermost element and arm 7 attached to the lowermost element. Arm 7 is fitted into sleeve 1.4 on the housing with tube 5 passing through the uppermost part of the housing and the opening sealed by suitable gasketing means 1.5. By employing the arm and sleeve arrangement, the plurality of elements are free to undergo limited movement, avoiding the need to accurately calculate and provide for the precise amount of movement which will be caused by expansion. Furthermore, in the smaller units, i.e., where only a few elements are connected together, it is not completely necessary to employ the arm and sleeve assembly; rather, the elements are only attached at the top of the housing by hydrogen removal tube 5.

In operation, an impure hydrogen stream is passed through inlet 1.1 and is distributed throughout the housing by means of openings 1.3 in the manifold pipe. The impure hydrogen, as a result of pressure differential, contacts the nonporous hydrogen diffusion membranes 2.1 with pure hydrogen passing through the membrane. The hydrogen flows through porous bodies 2.2 to the central opening and through hydrogen removal pipe 5 to a suitable storage tank, or ancillary device which is to utilize the purified hydrogen. Impurities pass along the elements and are vented by passing into openings 1.3 of outlet pipe 1.2. Although it is preferred that the device employ a manifold-type inlet and outlet piping, it is not completely essential.

In view of the matched configuration and the balancing of stresses caused by the expansion of the membranes due to the adsorption of hydrogen, a particularly compact unit can be constructed. In the embodiment shown in the drawings, the apparatus housing is 6⅜ inches in diameter. The plurality of elements have a diameter of 6 inches. The elements are spaced 0.3 inch apart. As apparent, therefore, a device comprising 15 individual purifier elements as shown in the drawing is contained in a space of no more than about 5 inches. As is apparent, the diameter of the apparatus can be made larger or smaller and the number of elements in the device can be varied substantially, depending upon the required capacity of the unit.

The nonporous hydrogen diffusion membrane employed herein can be composed of any substance which will diffuse hydrogen at a sufficient rate, preferably at temperatures of from about 75–750° C., the normal operating temperature of the purifier. The metals of Groups V and VIII of the Mendelyeev's Periodic Table, such as palladium, columbium, and tantalum and alloys thereof, have been found to be particularly advantageous. However, silver and gold alloys of palladium are exceptional as a practical matter, and therefore preferred, due to their availability and superior hydrogen diffusion properties. The palladium alloy membranes for use herein contain from about 5–40 percent gold or silver, on a weight basis, with the remainder ordinarily being palladium. However, it may be advantageous for certain applications, i.e., where it is necessary to have increased structural strength, etc., to employ a third element, such as copper, platinum or tellurium in the alloy membrane. The amount of the additional metal will ordinarily not exceed more than about 5 percent of the total weight. Membranes having less than about 5 percent gold or silver do not possess the necessary structural strength after prolonged use for practical application. On the other hand, membranes having more than about 40 percent gold or silver will not diffuse sufficient hydrogen.

The thickness of the nonporous membrane depends to some extent upon the pressure differential to be applied across the membrane and upon the rapidity of the diffusion desired. Diffusion of hydrogen gas through the membrane is directly proportional to the pressure differential across the membrane and upon the rapidity of the diffu-membrane's thickness. However, as apparent from the discussion hereinbefore, the desideratum from the cost standpoint is to have the membranes as thin as possible and still have integrity and reliability. Membranes having a thickness of as low as 0.001 inch are operable in the herein described diffuser-purifier. The matched indentations are made using conventional fabricating techniques.

Although it is not completely essential, in order to obtain superior diffusion characteristics, it can be desirable to apply a thin film of a particulate substance to the surface of the non-porous membrane and, preferably, a thin film of metal black. Such films have been found to increase the rate of diffusion of the membranes and prolong their useful life. The coating of the nonporous membranes can be performed by methods known in the art, for example, by electrodeposition from an aqueous acid solution or the like.

The porous bodies which are employed herein can be fabricated from metal such as nickel, stainless steel and aluminum, or carbon particles or the like using conventional fabrication procedures such as are described in U.S. Patents Nos. 2,300,048 and 3,007,991 and British Patents Nos. 781,433 and 369,964. As will be apparent, where the stamped or indented membranes are employed in phase, the molding operation is simplified. The porosity of the bodies can vary over substantial ranges with it only being essential that passages exist to permit flow of the hydrogen to the center openings.

While various modifications of the invention are disclosed, it should be appreciated that the invention is not restricted thereto. Other embodiments will be apparent to one skilled in the art which come within the scope and spirit of the appended claims.

What is claimed is:

1. An apparatus for the purification of hydrogen comprising a housing having inlet means for introducing a stream of impure hydrogen and outlet means for venting impurities contained in said hydrogen stream from said housing, at least one element contained therein comprising two matched indented circular nonporous thin metal hydrogen permeable membranes, each of said membranes having a plurality of circular indentations extending from the center to the periphery of said membrane, said membranes being sealed together at their peripheries, with said indentations being matched to be in phase or out of phase, the uppermost membrane of said element having a hole in the center thereof and hydrogen removal means in operable association with said hole for removing hydrogen from between said membranes and from said housing means and for securing said element to said housing.

2. The apparatus of claim 1 wherein said matched indented circular nonporous hydrogen permeable membranes are separated and supported by a porous body contained therebetween.

3. The apparatus of claim 2 wherein the matched elements are in phase as shown in FIG. 2 hereof.

4. The apparatus of claim 2 wherein the matched elements are out of phase as shown in FIG. 3 hereof.

5. The apparatus of claim 2 wherein the membranes are alloys of palladium and silver and have a thickness of less than about 0.003 inch.

6. The apparatus of claim 2 wherein the porous body is porous nickel.

7. The apparatus of claim 2 wherein a plurality of elements are contained in said housing, said plurality of elements containing openings in the center of both of said membranes with mated fittings inserted in gas-tight relationship in said openings and secured to each other.

8. The apparatus of claim 7 wherein the housing comprises a sleeve-like protrusion from its bottom for association with an arm-like fitting extending from the lowermost membrane of said plurality of elements.

References Cited

UNITED STATES PATENTS 2,958,391  11/1960  De Rosset _____ 55—16

FOREIGN PATENTS 724,479  12/1965  Canada.
969,673   9/1964  Great Britain.
972,166  10/1964  Great Britain.

REUBEN FRIEDMAN, *Primary Examiner.*

J. A. DEE, *Assistant Examiner.*